United States Patent
Sturdy et al.

(10) Patent No.: US 7,111,602 B2
(45) Date of Patent: Sep. 26, 2006

(54) INTAKE MANIFOLD TUNING VALVE ACTUATOR

(75) Inventors: David Ronald Sturdy, Wilmington, NC (US); Ronald Lewis Marsh, Wilmington, NC (US); James Derek Gallaher, Leland, NC (US); Paul Frederick Olhoeft, Leland, NC (US)

(73) Assignee: Sturdy Corporation, Wilmington, NC (US)

( * ) Notice: Subject to any disclaimer, the term of this patent is extended or adjusted under 35 U.S.C. 154(b) by 0 days.

(21) Appl. No.: 10/907,226

(22) Filed: Mar. 24, 2005

(65) Prior Publication Data

US 2005/0211215 A1  Sep. 29, 2005

Related U.S. Application Data

(60) Provisional application No. 60/556,122, filed on Mar. 25, 2004.

(51) Int. Cl.
*F02M 35/10* (2006.01)

(52) U.S. Cl. .................. 123/184.53; 123/337
(58) Field of Classification Search .......... 123/184.53, 123/337, 184.55, 184.56
See application file for complete search history.

(56) References Cited

U.S. PATENT DOCUMENTS

| | | | |
|---|---|---|---|
| 4,087,728 A | 5/1978 | Porter | |
| 4,246,526 A | 1/1981 | Phillips | |
| 4,570,590 A | 2/1986 | Kawai et al. | |
| 4,645,992 A | 2/1987 | Ritenour | |
| 4,738,233 A | 4/1988 | Hitomi et al. | |
| 4,765,286 A | 8/1988 | Lyjak | |
| 4,816,987 A | 3/1989 | Brooks et al. | |
| 5,092,298 A | 3/1992 | Suzuki et al. | |
| 5,113,826 A | 5/1992 | Anzai | |
| 5,123,382 A | 6/1992 | Aoki et al. | |
| 5,129,368 A | 7/1992 | Kristl et al. | |
| 5,168,954 A * | 12/1992 | Nakaniwa et al. | 180/197 |
| 5,197,433 A * | 3/1993 | Dykstra et al. | 123/184.55 |
| 5,370,094 A | 12/1994 | Sorg et al. | |
| 5,411,239 A | 5/1995 | Sorensen | |
| 5,590,628 A | 1/1997 | Patyi et al. | |
| 5,632,239 A | 5/1997 | Patyi et al. | |
| 5,704,328 A | 1/1998 | Dykstra et al. | |
| 5,740,778 A | 4/1998 | Corcoran et al. | |
| 5,854,545 A | 12/1998 | Eibel | |
| 5,992,370 A | 11/1999 | Pringle et al. | |
| 6,051,948 A | 4/2000 | Vepy | |
| 6,188,193 B1 | 2/2001 | Michelson | |
| 6,260,528 B1 | 7/2001 | Pringle et al. | |

(Continued)

*Primary Examiner*—Stephen K. Cronin
*Assistant Examiner*—Hyder Ali
(74) *Attorney, Agent, or Firm*—Reising, Ethington, Barnes, Kisselle, P.C.

(57) ABSTRACT

An actuator for an intake manifold tuning valve to regulate airflow in an intake manifold of an internal combustion engine. The actuator includes a motor, control circuit, and sensor all mounted in a housing that has an opening through which an output shaft extends. The output shaft carries a valve blade that is positioned within the intake manifold when the actuator is assembled in place. The sensor provides the control circuit with feedback data indicating the position of the valve blade and this data permits the actuator itself to provide closed loop control of the position of the valve blade using an actuator command received from the engine's electronic control unit. The housing includes a stop member that engages the valve blade at a certain rotational position to thereby enable diagnostic checks of the valve to determine if the blade is present and functioning.

14 Claims, 5 Drawing Sheets

U.S. PATENT DOCUMENTS

| | | |
|---|---|---|
| 6,276,316 B1 | 8/2001 | Arai et al. |
| 6,291,955 B1 | 9/2001 | Itabashi et al. |
| 6,329,777 B1 | 12/2001 | Itabashi et al. |
| 6,386,178 B1 * | 5/2002 | Rauch ............... 123/337 |
| 6,422,201 B1 | 7/2002 | Yamada et al. |
| 6,637,397 B1 | 10/2003 | Ward et al. |
| 6,683,429 B1 | 1/2004 | Pringle et al. |
| 6,802,292 B1 | 10/2004 | Nelson et al. |
| 2003/0182049 A1 | 9/2003 | Bale et al. |
| 2003/0183202 A1 | 10/2003 | Mischker et al. |
| 2004/0035383 A1 | 2/2004 | Ward et al. |
| 2004/0107934 A1 | 6/2004 | Bucknell et al. |

* cited by examiner

INTAKE MANIFOLD TUNING VALVE ACTUATOR

CROSS-REFERENCE TO RELATED APPLICATION

This application claims the priority of U.S. Provisional Application No. 60/556,122, filed Mar. 25, 2004, the entire contents of which are hereby incorporated by reference.

TECHNICAL FIELD

This invention relates to intake manifold tuning valve (IMTV) actuators and control circuits therefor.

BACKGROUND OF THE INVENTION

In 1970, Congress passed the Clean Air Act and established the Environmental Protection Agency (EPA) which initiated a series of graduated emission standards and requirements for maintenance of vehicles over extended periods of time. In the beginning there were few standards, however, in 1988, the Society of Automotive Engineers (SAE) developed a set of diagnostic test signals, and the EPA adapted most of the SAE standards for On-Board Diagnostic programs and recommendations (OBD). Currently, the second generation of these diagnostic standards (OBD-II) have been adopted by the EPA and, as such, internal combustion engine vehicles must now meet the federally mandated OBD-II standards for the life of the vehicle.

A main focus of the EPA in regard to internal combustion engines is on the emissions of the engines. To meet the current federally mandated emission standards prescribed by OBD-II, an internal combustion engine requires management of air flow through an intake manifold. In addition, regulatory requirements mandate that the components used to ensure compliance of the emission standards be continuously monitored over the life of the vehicle. This is in an effort to ensure that the emissions performance over the useful life of the vehicle is not degraded due to a component or system malfunction. For the air intake manifold, one device used in some engines to obtain improved emissions and engine performance is an intake manifold tuning valve which can be used to join intake manifold plenums at a certain range of engine speeds. Generally, the actuators used to control the intake manifold tuning valves (herein referred to as IMTV actuators) have been constructed as two position actuators, having a fully open position and a fully closed position. In addition, the actuators generally do not provide position feedback capability to indicate which position the actuator is in. This two position operation of the IMTV actuator limits its ability to regulate the air flow through the intake manifold, and thus, can restrict the ability of the engine to operate at its a maximum performance level and can limit the ability of the engine to meet emissions and fuel economy goals.

The OBD-II regulations require that the presence and functionality of emission systems components be monitored. Generally, the monitoring function may be performed using one or more external sensors connected to the vehicle engine controller. This approach adds to the complexity of the emission system assembly, for example by adding additional components and wire connections. In addition, the added external components increase the amount of communication and analysis burden on the engine controller. Though the current OBD-II emission control system requirements come at an increased cost, the manufacturer has little option but to take on these expenses, as a result of having to meet the federally mandated standards.

SUMMARY OF THE INVENTION

The present invention provides a valve actuator method and apparatus for an IMTV or other intake manifold valve. In accordance with one aspect of the invention, the valve actuator is used to position a valve blade within the intake manifold. The actuator includes a motor, valve blade drive member, control circuit, and sensor. The valve blade drive member is coupled to the motor and is adjustable to different positions by the motor. The control circuit has an input that receives actuator commands and has an output connected to the motor to control operation of the motor. The sensor is connected to the control circuit and provides the control circuit with data indicative of the position of the drive member. The control circuit operates the motor in response to the actuator commands to move the drive member to a commanded position, and the control circuit receives feedback signals from the sensor relating to the position of the drive member. Preferably, the control circuit provides closed loop control of the position of the drive member using the feedback signals. Also preferably, the control circuit outputs position data relating to the position of the drive member and this information can be used by an engine control unit for diagnostic and other purposes. The actuator can include a housing in which the motor, control circuit, and sensor are mounted.

In accordance with another aspect of the invention, there is provided an intake manifold tuning valve actuator that includes a motor, valve blade, control circuit, and stop member that prevents full rotation of the valve blade about its rotational axis. The valve blade is coupled to the motor and is rotationally adjustable about the axis to different positions by the motor. The control circuit has an input that receives actuator commands and has an output connected to the motor to control rotation of the valve blade via the motor. The stop member is located adjacent the valve blade. Preferably, the motor and control circuit are mounted in a housing with valve blade being located exterior of the housing and the stop member being located on the housing adjacent the valve blade. Rotation of the valve blade past a predetermined position results in the valve blade engaging the stop member which prevents it from further rotating, unless the valve blade is not present or is otherwise not working properly.

In accordance with yet another aspect of the invention, there is provide various methods of using the valve actuator to regulate airflow in the intake manifold. One of these methods includes use of the sensor to provide closed loop position control. Another method is used for diagnostic testing and involves use of the stop member to determine whether the valve blade is present and functioning properly. This diagnostic capability can be useful for OBD-II compliance.

DETAILED DESCRIPTION OF THE PREFERRED EMBODIMENTS

Figure 1:
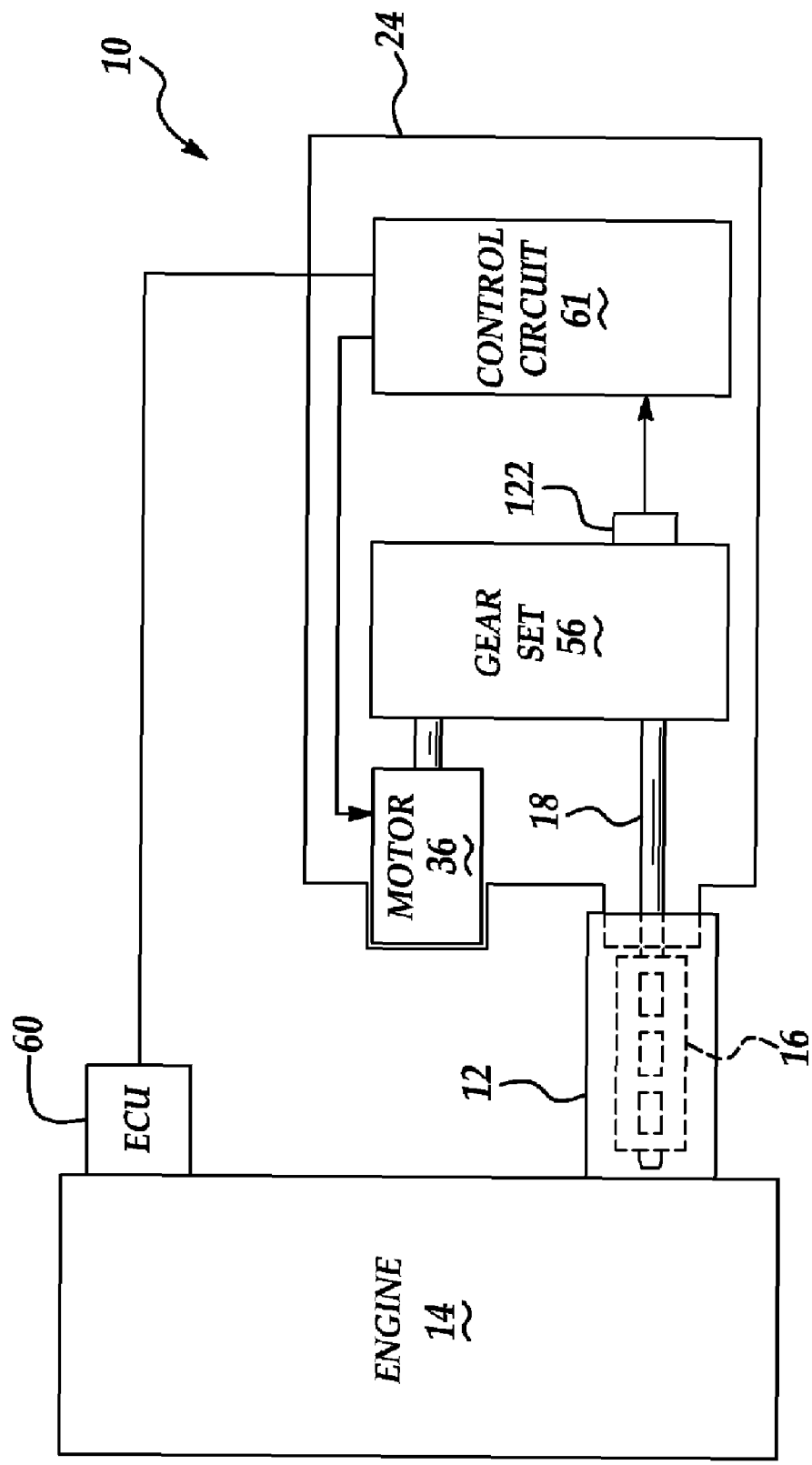
FIG. 1 is a diagrammatic view of an IMTV actuator constructed in accordance with the invention and shown installed in an intake manifold of a vehicle internal combustion engine.

As illustrated in FIG. 1, an IMTV actuator represented generally at 10 is mounted to an intake manifold 12 of an internal combustion engine 14 to help regulate the air flow through the intake manifold 12 and optimize the running performance of the engine 14. IMTV actuator 10 is connected to an engine control unit (ECU) 60 that is programmed to control actuator 10 to provide the engine 14 with a more optimal flow of air, thus enabling the engine 14 to burn fuel efficiently with reduced emissions.

In general, IMTV actuator 10 is a single, self contained module that includes a control circuit 61 which operates a motor 36 connected to an output shaft 18 via a gear set 56, all of which are mounted in a housing 24. The output shaft 18 extends out of housing 24 and supports a valve blade 16 that is securely attached to the shaft 18 for concomitant rotation therewith. Shaft 18 thus comprises a valve blade drive member that is controlled by motor 36 and used to move the valve blade 16 between various positions within the intake manifold 12. Rotatable or pivotable output drive members other than shaft 18 could be used as well. As will be explained in further detail below, ECU 60 delivers actuator commands to control circuit 61 which responds to these command signals by energizing the motor 36 to move the valve blade 16 to the commanded position. A sensor 122 located adjacent one of the gears in the gear set 56 detects the instantaneous position of the gear and, thus, the output shaft 18 and valve blade 16. The position information from this sensor 122 is fed back to the control circuit 61 which uses this feedback data to provide closed loop control of the valve blade position. Control circuit 61 is further operable to return feedback data to the ECU 60 indicating the actual, sensed position of the shaft 18 and valve blade 16. Furthermore, as will also be discussed below, the IMTV actuator 10 includes a physical stop on its housing adjacent the valve blade 16 which prevents full rotation of the blade about its axis. This stop is used for integrity checking to determine whether or not the valve blade is present and intact.

Figure 4:
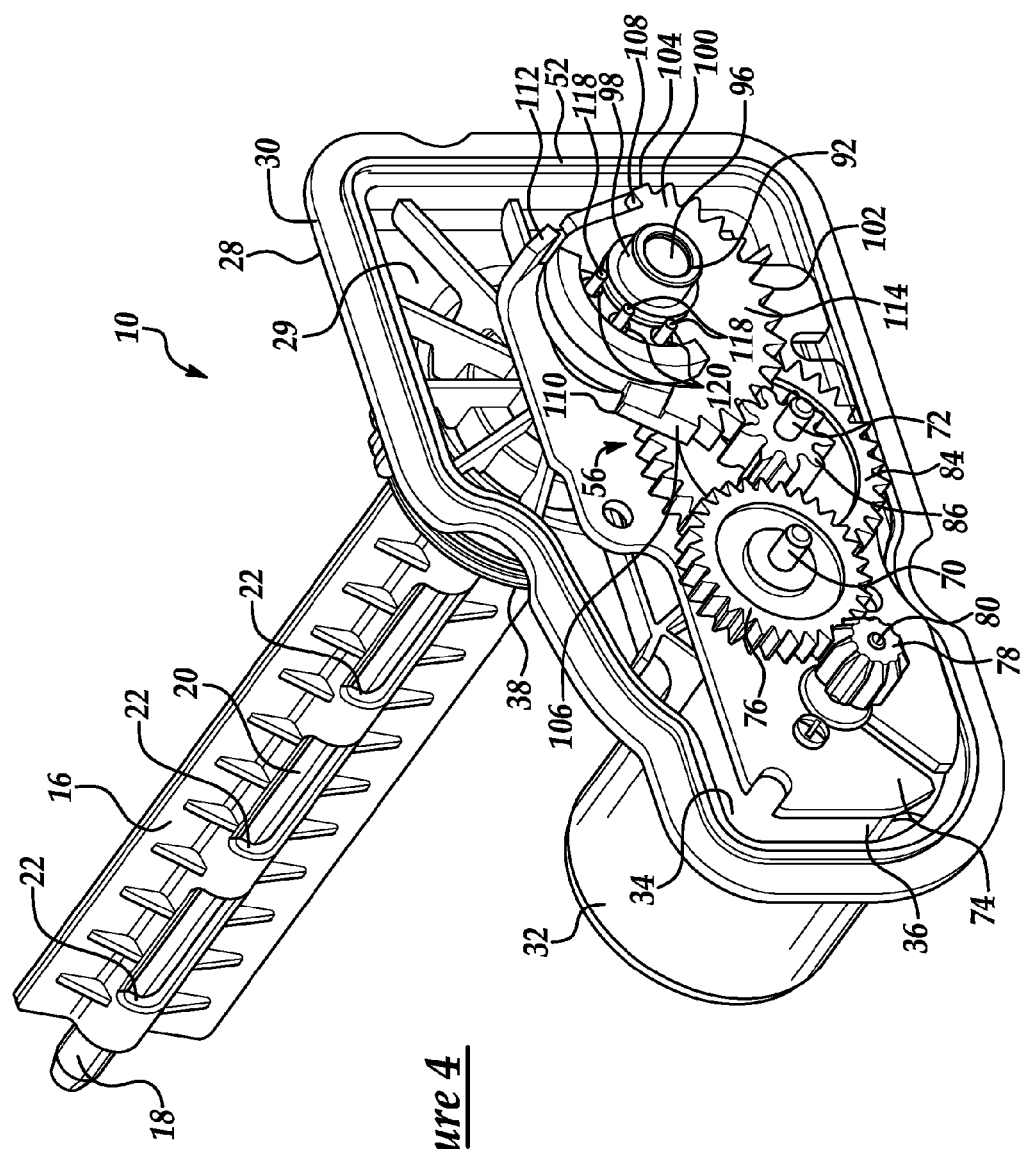
FIG. 4 shows a bottom perspective view of the IMTV actuator of FIG. 1 with a base of the assembly removed.
Figure 5:
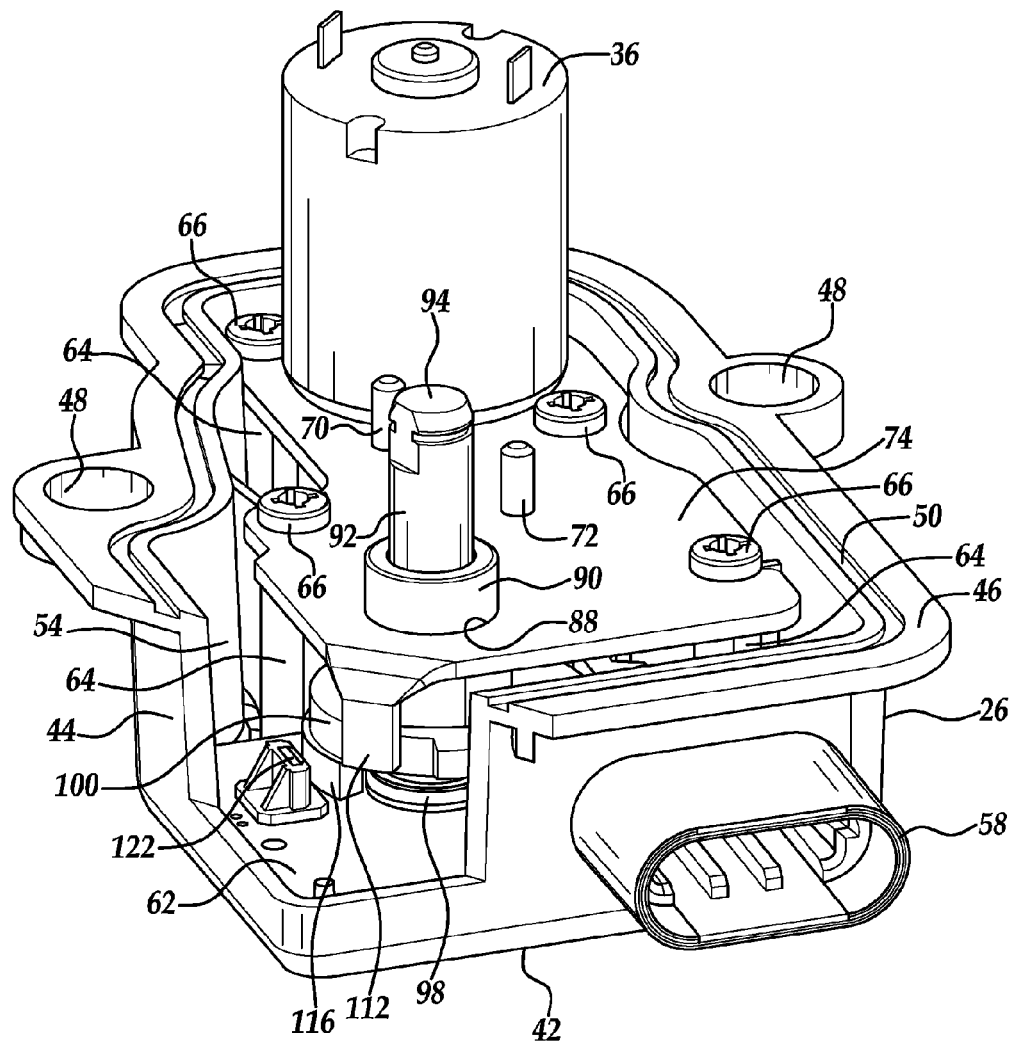
FIG. 5 shows a perspective view of the base of the IMTV actuator with a motor and a gear set received therein.
Figure 6:
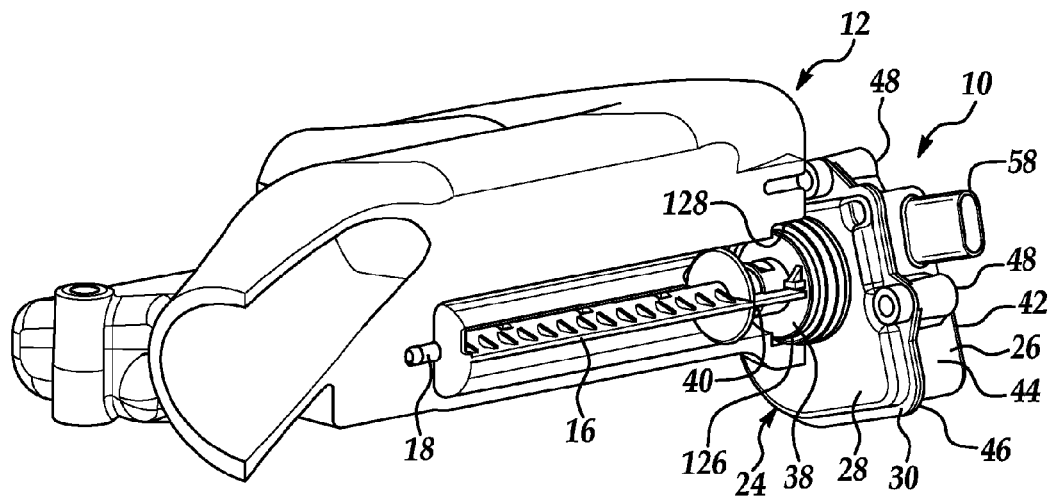
FIG. 6 shows the IMTV actuator assembled to an intake manifold and operating in an open position.
Figure 7:
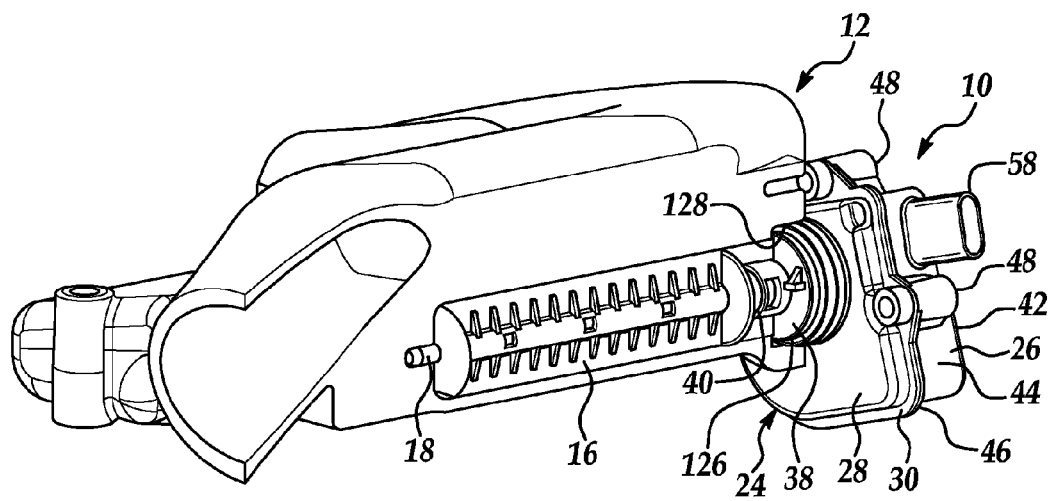
FIG. 7 is a view similar to FIG. 6 with the IMTV actuator operating in a closed position.

With reference now to FIGS. 2–5, valve blade 16 is used to regulate the flow of air through the intake manifold 12, and can move between a fully open position allowing air to flow freely through the intake manifold 12, and a closed position generally restricting the flow of air through the intake manifold 12. These open and closed positions are depicted in FIGS. 6 and 7, respectively. The valve blade 16 is supported on the output shaft 18 for conjoint rotational movement with the shaft 18. To prevent relative movement between the blade 16 and shaft 18, the blade is keyed to the shaft 18 by at least one and, as shown here, a pair of generally opposite longitudinally extending flat surfaces 20 (FIG. 4) for mating engagement with similarly shaped surfaces on a through passage 22 in the valve blade 16. The valve blade can be attached and locked to the shaft 18 in other ways, such as by staked protrusions extending from the valve blade 16 into the shaft 18, or vice versa. The valve blade 16 is generally infinitely adjustable between its fully open and closed positions to permit precise regulation of the air flow through the intake manifold 12; however, discrete, incremental adjustability of the valve blade could be used instead, or even a two-position blade actuator design could be used, depending on the design constraints and requirements for a particular application.

Figure 2:
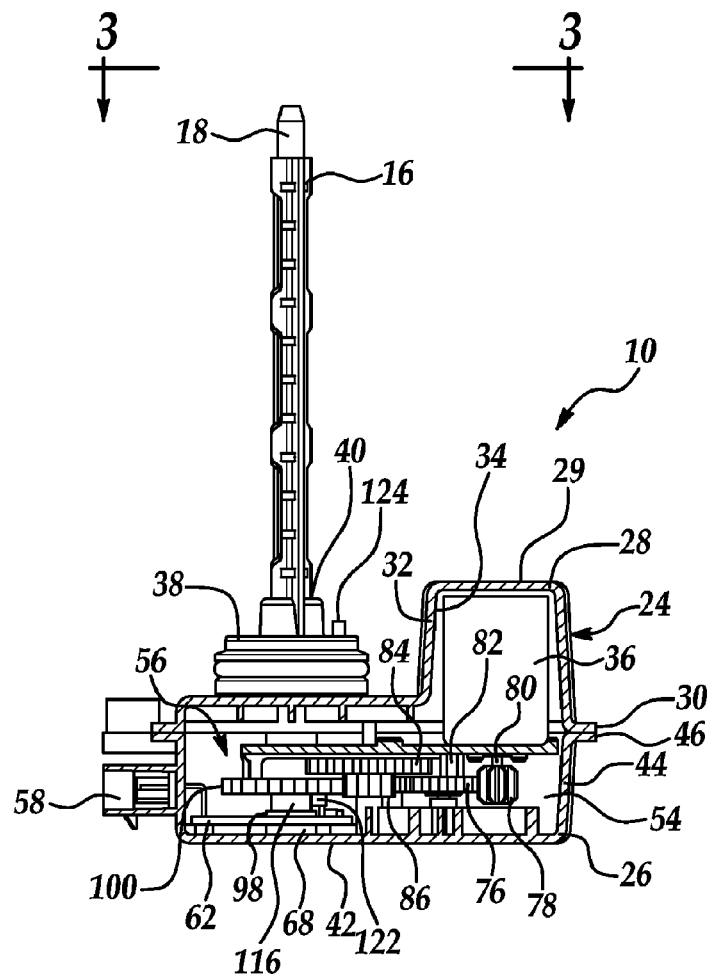
FIG. 2 shows a partially cutaway side view of the IMTV actuator of FIG. 1.

As shown in FIG. 2, housing 24 includes a base 26 and a cover 28. These housing components can be manufactured using known methods and materials such as, for example, molded from nylon impregnated with glass fiber or die-cast in aluminum or steel. As best shown in FIGS. 2 and 4, the cover 28 has an upper wall 29 with an outer perimeter defining a flange 30 and a generally cylindrical raised portion 32 defining a cavity 34 therein for receiving motor 36. The cover 28 has an opening with a mounting flange 38 attached thereto. The mounting flange 38 has an opening 40 through which the shaft 18 supporting the valve blade 16 extends such that the valve blade is supported by the housing 24 at a location outside of the housing.

Figure 3:
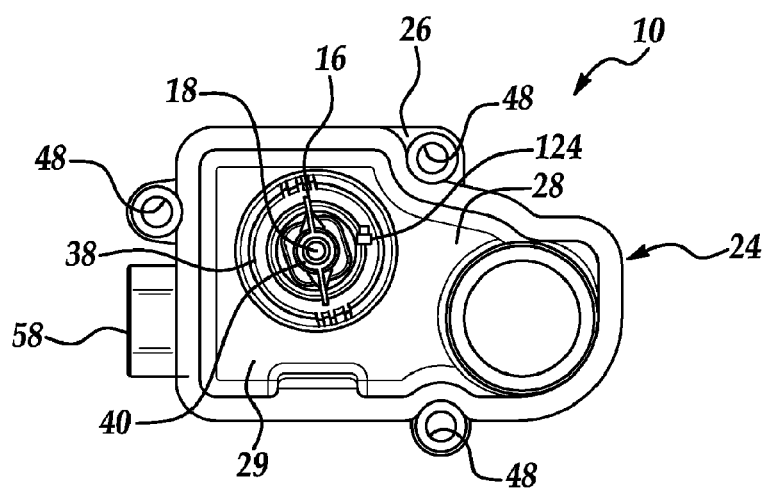
FIG. 3 shows a top view looking generally in the direction of arrow 3 of FIG. 2.

The base 26 has a lower wall 42 with a side wall 44 extending generally laterally and upwardly therefrom. The side wall 44 terminates at an outer perimeter defining a lateral flange 46 extending from the side wall 44 constructed for mating engagement with the flange 30 of the cover 28. As shown in FIGS. 3 and 5, the flange 46 has a plurality of openings, and shown here as three fastener openings 48, extending laterally outwardly therefrom to facilitate attachment of the base 26 and the cover 28 to the intake manifold 12. Desirably, the flange 46 of the base 26 has a peripheral groove 50 extending therein for receipt of a seal 52 (FIG. 4) to facilitate an airtight sealing engagement of the base 26 with the cover 28 upon assembly. It should be recognized that the flange 30 of the cover 28 may also incorporate a groove to receive the seal 52.

As shown in FIGS. 2 and 5, the side wall 44 and lower wall 42 define a cavity 54 for receiving at least in part a reducing gear set 56 (FIGS. 2 and 4) interconnecting the drive shaft 80 of motor 36 with the output shaft 18 and, thus, valve blade 16. The side wall 44 has an integral electrical plug 58 extending laterally therefrom for receiving an electrical socket connected via a wiring harness to the ECU 60. The terminals of electrical plug 58 are wired to a printed circuit board (PCB) 62 carrying control circuit 61. To facilitate attachment of the gear set 56 within the cavity 54, a plurality of internally threaded bosses 64 extend laterally upwardly from the lower wall 42 into the cavity 54 for receipt of a plurality of threaded fasteners having enlarged heads 66 (FIG. 5) to secure the gear set 56 to the bosses 64, and thus the base 26. Additionally, the lower wall 42 has a bearing housing 68 extending laterally therefrom into the cavity 54. The bearing housing 68 is arranged for concentric alignment with the opening 40 in the mounting flange 38 upon assembly of the cover 28 to the base 26.

The gear set 56 comprises a gear train having a pair of shafts 70, 72 maintained at least in part by a plate 74 (FIGS. 4 and 5). The shafts 70, 72 extend perpendicularly from the plate 74, with one of the shafts 72 receiving a driven gear 76 having teeth in meshed engagement with a drive gear 78 attached to drive shaft 80 of the motor 36. The driven gear 76 has a pinion gear 82 (FIG. 2) preferably with a reduced diameter from the driven gear 76 extending concentrically and laterally therefrom. The other shaft 72 receives an idler gear 84 having teeth arranged for meshed engagement with the pinion gear 82. The idler gear 84 has a pinion gear 86 preferably with a reduced diameter from the idler gear 84 extending concentrically and laterally therefrom. It should be understood that the gear set 56 may be configured differently by using a variety of differently sized or type gears and having differing numbers of gear teeth in order to meet the specific application requirements, such as load constraints, drive motion, and packaging constraints, for example.

As shown in FIG. 5, the plate 74 has an opening 88 for receiving a bearing 90 for fixed attachment therein. The bearing 90 is sized to receive a driven shaft 92 having one end 94 arranged for attachment to the elongated shaft 18 which carries the valve blade 16. The driven shaft 92 has another end 96 arranged for receipt in another bearing 98 (FIG. 4) housed in the bearing housing 68 extending from the lower wall 42 of the base 26. Accordingly, the driven shaft 92 is supported for rotation by the pair of bearings 90, 98.

Mounted on the driven shaft 92 is a segmented driven gear 100 having teeth 102 arranged for meshed engagement with the pinion gear 86. The driven gear 100 is securely attached to the driven shaft 92 for conjoint rotation therewith. The gear teeth 102 on the gear 100 span approximately 120 degrees, although gear 100 is generally driven about 85 degrees in use. The gear teeth 102 terminate at flat faces 104,106, that are bounded on one side by perpendicular surfaces 108, 110, respectively, that extend radially inwardly therefrom. The surfaces 108, 110 act as stop surfaces against a downwardly bent tab 112 extending generally laterally from the plate 74. Accordingly, the tab 112 acts as a positive stop to limit the angular rotation of the driven gear 100, thereby ensuring that the teeth 102 of the segmented driven gear 100 remain in meshed engagement with the pinion gear 86 under any conditions, such as an over rotation of the motor 36, for example. Other ways of preventing over rotation of gear 100 will be apparent to those skilled in the art.

As best shown in FIG. 4, the driven gear 100 has a side 114 with a generally arcuate magnet 116 attached thereto. Magnet 116 is used in conjunction with the position sensor 122, as will be discussed below, and is attached to gear 100 by a plurality of plastic fingers 118 extending laterally from the side 114 for receipt in through openings 120 in a surface of the magnet 116. The fingers 118 are heat staked to retain the magnet 116 to the side 114 of the driven gear 100. Other means of attaching the magnet could of course be used. Desirably, the magnet 116 is a two pole magnet constructed from a magnetized polymeric material, although it should be recognized that any suitable magnetic material may be used.

As shown in FIG. 5, the printed circuit board 62 is supported by the lower wall 42 of the base 26. The PCB 62 carries position sensor 122 which can be attached in any suitable manner, such as by heat staking. In the illustrated embodiment, position sensor 122 is a Hall Effect sensor used to determine the position of the output shaft 18, and hence, that of the valve blade 16. This position information is used by the control circuit 61 in achieving the proper blade position as well as for reporting back blade position to the ECU 60 and performing integrity checks of the blade. Sensor 122 is positioned on PCB 62 so that it is located adjacent to the magnet 116 when the PCB 62 and gear set 56 are all assembled in their proper positions within housing 24. As the magnet 116 rotates conjointly with the driven gear 100 and the driven shaft 92, the magnet 116 rotates relative to the PCB 62, and thus the Hall Effect sensor 122, thereby allowing the Hall Effect sensor 122 to receive a continuously variable magnetic flux from the magnet 116 as it rotates. Accordingly, the Hall Effect sensor 122 generates a signal indicative of this changing magnetic field condition and this signal is used by the control circuit to determine the instantaneous position of the gear 100, and thus, the position of valve blade 16 (by way of interconnected shafts 18 and 92).

Control circuit 61 is a microprocessor based control circuit that continuously monitors ECU 60 for commands to rotate the valve blade 16 to a particular angular position within the intake manifold 12. When receiving commands, the control circuit preferably uses a debounce algorithm to insure that a valid position command has been sent by the ECU 60 before activating the motor 36 to initiate movement. Suitable debouncing algorithms are known to those skilled in the art.

To move the valve blade 16, control circuit 61 sends a signal to energize the motor 36, thereby causing the gear set 56 to rotate the valve blade 16 towards the commanded angular position. As magnet 116 rotates with the gear train, the control circuit monitors the flux direction and strength of the magnetic field impinging on the Hall Effect sensor 122. The voltage level of the position feedback signal from the Hall Effect sensor 122 is compared by the control circuit 61 to a voltage range programmed within the control circuit to ensure that the received feedback signal voltage is within a valid range. Upon determining that the voltage level is proper, the actual angular position of the driven shaft 92 (and, thus, the valve blade 16) is determined, and this can be done in various way such as by using equations or a look-up table. This sensed, actual position can then be compared by the control circuit to the commanded position received from the ECU 60 and the resulting error used to adjust the position of the valve blade until no error exists between the commanded and actual positions, or until the error falls to within an acceptable level. In this way, the control circuit 61 provides closed loop control of the position of valve blade 16, and this is done without involving the ECU 60 and, thus, without any additional computational effort by ECU 60. Other closed loop control schemes can be used in addition to or in lieu of proportional control, including integral and derivative control, and these control approaches can be used not only to achieve the commanded position, but if desired, to also control the speed at which the adjustments are made. For example, for larger angular adjustments, the rotational speed of the valve blade could be increased. Such control schemes are known to those skilled in the art.

Once the valve blade has reached its commanded position, as determined from the position feedback from sensor 122, the control circuit 61 interrupts power to the motor 36. Thereafter, the control circuit 61 will wait for a subsequent actuator command from ECU 60. Additionally, the control circuit will periodically sample the angular position of the valve blade 16. If the valve blade 16 inadvertently moves from its commanded angular position, the control circuit again activates the motor 36 to re-orient the valve blade 16 back to its commanded angular position. In addition to using the position feedback from sensor 122 for closed loop control, the control circuit 61 can also report the actual position back to the ECU 60, thereby providing confirmation of the valve blade position.

Yet another use for the sensor 122 is in performing integrity checks of the valve blade 16. Since OBD-II standards require verification that the valve blade is present and functioning properly, sensor 122 can be used for this purpose in conjunction with a physical stop member that prevents free rotation of the valve blade 16 past a predetermined position. As shown in FIGS. 2 and 3, the mounting flange 38 attached to the cover 28 has a stop member 124 extending generally upwardly therefrom. To conduct the integrity check, thus verifying that the valve blade 16, shafts 18, 92, and all associated components are present and functional, an internal software algorithm programmed within the control circuit 61 energizes the motor 36 in an attempt to rotate the valve blade 16 past the predetermined angular position where it engages the stop member 124. Then, as the valve blade 16 reaches the predetermined angular position, it contacts the stop member 124 which prevents further rotation of the blade, shafts, and gears. Control circuit 61 monitors movement of the valve blade using feedback from the sensor 122, and determines whether the blade has properly engaged the stop member 124 and stopped rotating by waiting a preselected amount of time and then checking for continued rotation of the motor. Again, determination that the motor is rotating is done via sensor 122 which monitors movement of gear 100. If no continuing rotation is detected, then the integrity check was successful and, if desired, diagnostic data can be returned to the ECU 60 indicative of this successful test result. On the other hand, if the motor continues to rotate after the preselected amount of time, then this indicates that the blade did not encounter the stop member 124 and the test has failed. In this case diagnostic data (such as a standard diagnostic code) is returned to the ECU 60 which can be programmed to instruct the vehicle to operate in a safety mode. The safety mode may include illuminating a service engine light within the driver compartment, instructing the engine 14 of the vehicle to operate at a reduced performance level, or any other desired operating condition. The signals communicated from the control circuit to the ECU 60 may be sent as analog or digital signals and can be sent using any suitable protocol or other communication approach, as will be known to those skilled in the art. Control circuit 61 can be programmed to periodically perform the integrity check, or can do it only upon initiation by a suitable command from ECU 60.

Attempted rotation of the valve blade beyond the predetermined position where it engages stop member 124 can be accomplished in different ways, such as by simply commanding the motor to run continuously in a certain direction, or by attempting to rotate to an over-travel target position. To reduce the stresses on the motor and gears while they continues to attempt rotation of the valve blade past the predetermined stop position, the power and rate of travel of the motor 36 can be conducted at reduced rates.

To facilitate an airtight seal between the actuator 10 and the intake manifold 12, the mounting flange 38 is generally equipped with an annular seal 126 for sealing engagement with an opening 128 in the intake manifold 14. The actuator 10 is easily attached to the intake manifold 12 through the use of fasteners 130 passing through the fastener openings 48 in the base 26, with the fasteners 130 generally threaded within openings in the intake manifold 12. Accordingly, a reduction in assembly costs is recognized by providing a unitized actuator 10 requiring little time for attachment to the intake manifold 12 in assembly. In addition, the actuator 10 can be easily removed from the intake manifold 12 for service.

It will thus be apparent that there has been provided in accordance with the present invention an IMTV actuator which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For example, for applications where the valve blade 16 is supplied as a part of the intake manifold itself, the IMTV actuator need only include the output shaft 18 or some other valve blade drive member that interconnects with the valve blade. Furthermore, in such instances, the stop member, if used, can be provided as a hard stop on the intake manifold itself, rather than on the IMTV actuator. All such variations and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A valve actuator for use in an intake manifold valve to regulate airflow through an intake manifold of an internal combustion engine, comprising:
   a motor;
   a valve blade drive member coupled to said motor, said drive member being adjustable to different positions by said motor;
   a control circuit having an input that receives actuator commands and having an output connected to said motor to control operation of said motor; and
   a sensor connected to said control circuit, said sensor providing said control circuit with data indicative of the position of said drive member;
   wherein said control circuit operates said motor in response to said actuator commands to move said drive member to a commanded position, and wherein said control circuit receives feedback signals from said sensor relating to the position of said drive member; and
   wherein said motor includes a drive shaft and said actuator includes a gear set connected to said drive shaft, said valve blade drive member being connected to said gear set such that said drive member can driven to various positions by said motor via said gear set, and wherein said sensor is positioned adjacent said gear set to detect the rotational position of at least one gear in said gear set.

2. A valve actuator for use in an intake manifold valve to regulate airflow through an intake manifold of an internal combustion engine, comprising:
   a motor;
   a valve blade drive member coupled to said motor, said drive member being adjustable to different positions by said motor;
   a control circuit having an input that receives actuator commands and having an output connected to said motor to control operation of said motor;
   a sensor connected to said control circuit, said sensor providing said control circuit with data indicative of the position of said drive member; and
   a housing, wherein said motor, control circuit, and sensor are mounted in said housing;
   wherein said control circuit operates said motor in response to said actuator commands to move said drive member to a commanded position, and wherein said control circuit receives feedback signals from said sensor relating to the position of said drive member.

3. A valve actuator as defined in claim 2, further comprising a valve blade assembly that includes said drive member and a valve blade mounted on said drive member, wherein said housing includes an opening with said valve blade assembly extending out of said housing through said opening.

4. An intake manifold tuning valve that includes the valve actuator of claim 2.

5. An intake manifold tuning valve actuator for regulating airflow through an intake manifold of an internal combustion engine, comprising:
 a motor;
 a valve blade coupled to said motor and being rotationally adjustable about an axis to different positions by said motor;
 a control circuit having an input that receives actuator commands and having an output connected to said motor to control rotation of said valve blade via said motor; and
 a stop member located adjacent said valve blade such that said stop member prevents full rotation of said valve blade about said axis when said valve blade contacts said stop member.

6. An intake manifold tuning valve actuator as defined in claim 5, further comprising a housing, said motor and control circuit being mounted in said housing and said valve blade being supported by said housing at a location outside of said housing, wherein said stop member is located on said housing adjacent said valve blade.

7. An intake manifold tuning valve actuator as defined in claim 5, wherein said control circuit operates said motor to rotate said valve blade until it engages said stop member, and wherein said control circuit detects engagement of said valve blade with said stop member.

8. An intake manifold tuning valve actuator as defined in claim 5, further comprising a valve blade assembly that includes said valve blade mounted on a shaft that is coupled to said motor such that said shaft can be rotated by operation of said motor, wherein said stop member is positioned adjacent said valve blade such that said valve blade engages said stop member at a predetermined position and is inhibited from further rotation past said predetermined position; and
 wherein said control circuit commands said motor to rotate said valve blade past said predetermined position and outputs diagnostic data if said shaft rotates past a position corresponding to said predetermined position of said valve blade.

9. An intake manifold tuning valve actuator as defined in claim 8, wherein said control circuit determines that said shaft has rotated past the position that corresponds to said predetermined position of said valve blade by commanding said motor to rotate said valve blade past said predetermined position and then determining whether said shaft is continuing to rotate after a preselected amount of time.

10. An intake manifold tuning valve actuator for regulating airflow through an intake manifold of an internal combustion engine, comprising:
 a housing having an opening through a portion of said housing;
 a motor having a drive shaft that rotates during operation of said motor;
 an output shaft mounted on said housing for rotation about an axis;
 a gear set connected between said drive shaft and said output shaft, said gear set comprising a plurality of meshed gears including a first gear connected to said drive shaft and a last gear connected to said output shaft, wherein said output shaft is adjustable to different positions by operation of said motor;
 a control circuit having an input that receives actuator commands and having an output connected to said motor to control operation of said motor; and
 a sensor connected to said control circuit, said sensor being positioned relative to a selected one of said gears such that said sensor detects the position of said selected gear and provides feedback data to said control circuit indicating the position of said selected gear;
 wherein said control circuit determines the position of said output shaft using said feedback data, said control circuit further providing closed loop control of the position of said output shaft using said feedback data, and said control circuit further including a second output on which said control circuit provides position data relating to the position of said output shaft; and
 wherein said motor, gear set, control circuit, and sensor are carried by said housing with said output shaft extending outwardly through said opening in said housing.

11. An intake manifold tuning valve actuator as defined in claim 10, wherein said selected gear is securely attached to said output shaft for rotation about said axis such that the rotational positions of said selected gear and said output shaft are the same.

12. An intake manifold tuning valve actuator as defined in claim 10, wherein said sensor is positioned adjacent said selected gear.

13. A method of operating an intake manifold tuning valve actuator to adjust a valve blade for regulating airflow through an intake manifold of an internal combustion engine based on actuator commands received from an ECU, said intake manifold tuning valve actuator including a housing and a valve blade drive member that extends from said housing and connects to the valve blade to move it between two or more positions, said housing having an internal sensor that provides feedback data relating to the position of said valve blade drive member, said method comprising the steps of:
 receiving into said housing an actuator command indicative of a desired position;
 moving said valve blade drive member to the desired position using closed loop position control that is performed without involving the ECU, wherein this step of moving said valve blade drive member further comprises:
  detecting the actual position of said valve blade drive member using feedback data generated within said housing by said sensor, and
  adjusting the position of the valve blade drive member using the feedback data; and
 outputting from said housing position data indicative of that actual position.

14. A method of operating an intake manifold tuning valve actuator to conduct an integrity check to verify that a valve blade is present and functional, said intake manifold tuning valve actuator including a valve blade drive member that connects to the valve blade to move it between two or more positions, said method comprising the steps of:
 monitoring rotation of said valve blade;
 attempting to rotate the valve blade past a predetermined angular position associated with a stop;
 waiting a preselected amount of time before checking for continued rotation of the valve blade;
 determining that the integrity check was successful if no continuing rotation of the valve blade was detected; and
 determining that the integrity check failed if continued rotation of the valve blade is detected.

* * * * *

UNITED STATES PATENT AND TRADEMARK OFFICE
CERTIFICATE OF CORRECTION

PATENT NO.        : 7,111,602 B2                                   Page 1 of 1
APPLICATION NO.   : 10/907226
DATED             : September 26, 2006
INVENTOR(S)       : David Ronald Sturdy et al.

It is certified that error appears in the above-identified patent and that said Letters Patent is hereby corrected as shown below:

In Column 1, line 54, delete the word "a".

In Column 2, line 49, delete "provide" and insert --provided --.

In Column 6, line 25, delete "way" and insert -- ways --.

In Column 7, line 40, delete "continues" and insert -- continue --.

In Column 8, line 10, delete the second occurrence of "that".

Col. 8, In Claim 1, line 39. after "can", insert -- be --.

Signed and Sealed this

Thirteenth Day of March, 2007

JON W. DUDAS
*Director of the United States Patent and Trademark Office*